United States Patent
Curtiss et al.

(10) Patent No.: US 7,110,789 B1
(45) Date of Patent: Sep. 19, 2006

(54) WIRELESS COMMUNICATIONS DEVICE DOCKING SYSTEM AND METHOD

(75) Inventors: Troy Curtiss, Erie, CO (US); Matthew Charles Golden, San Diego, CA (US); David Werner, Boulder, CO (US); Andrew Glen Lejman, Lafayette, CO (US); Miles Kirby, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 492 days.

(21) Appl. No.: 10/093,089

(22) Filed: Mar. 7, 2002

Related U.S. Application Data (60) Provisional application No. 60/274,070, filed on Mar. 7, 2001.

(51) Int. Cl.
*H04M 1/00* (2006.01)

(52) U.S. Cl. .................. 455/556.1; 379/435
(58) Field of Classification Search ............. 455/556, 455/575.1, 90.2–90.3, 569.2, 563, 557, 550.1, 455/416, 74.1, 575.8–575.9, 556.1; 379/435, 379/446, 455, 454, 428.02, 355.01, 356, 379/357, 358, 142.04, 142.15, 142.17
See application file for complete search history.

(56) References Cited

U.S. PATENT DOCUMENTS

| | | | |
|---|---|---|---|
| 6,073,031 A | | 6/2000 | Helstab et al. |
| 6,704,580 B1* | | 3/2004 | Fintel ................ 455/550.1 |
| 2001/0034245 A1* | | 10/2001 | Swartz ................ 455/557 |
| 2002/0072390 A1* | | 6/2002 | Uchiyama ............. 455/557 |
| 2002/0086703 A1* | | 7/2002 | Dimenstein et al. ..... 455/557 |
| 2002/0106993 A1* | | 8/2002 | Shealtiel .............. 455/74.1 |
| 2002/0119800 A1* | | 8/2002 | Jaggers et al. .......... 455/550 |
| 2002/0181398 A1* | | 12/2002 | Szlam ................. 370/230 |
| 2003/0144030 A1* | | 7/2003 | Newmark .............. 455/557 |
| 2003/0157929 A1* | | 8/2003 | Janssen et al. ......... 455/416 |
| 2004/0063456 A1* | | 4/2004 | Griffin et al. .......... 455/550.1 |

OTHER PUBLICATIONS

Motorola Consumer Catalog, Miscellaneous documents, http://commerce.motorola.com/cig-bin/texis/co.../ db=db&query=StarTAC &submit=Submi) (Feb. 1, 2001).

* cited by examiner

*Primary Examiner*—Melody Mehrpour (57) ABSTRACT

A system and a method for docking a wireless communications device are provided. The system includes a docking station on which a wireless communications device is docked. A display on the docked wireless communications device provides the display for the docking system.

19 Claims, 6 Drawing Sheets

WIRELESS COMMUNICATIONS DEVICE DOCKING SYSTEM AND METHOD

RELATED APPLICATIONS

This application claims priority to U.S. provisional patent application No. 60/274,070, which has a filing date of Mar. 7, 2001 entitled "Wireless Communications Device Docking System and Method."

FIELD OF THE INVENTION

The present invention relates to a docking system receiving a wireless communications device and a method of operation.

BACKGROUND OF THE INVENTION

Known wireless telephones include for example cordless telephones, analog cellular telephones and digital cellular telephones. A typical know cordless telephone includes a base unit and a handset. The handset connects to a telephone network via a cordless connection with the base unit, which in turn is connected to the telephone network via telephone cables and connectors. Such cordless telephones suffer from a number of disadvantages, such as a limited cordless operating range. Mobility is also limited, for example, by the length of the telephone cables connecting the base unit to a phone jack in a wall. Another disadvantage of the conventional cordless telephone is that a particular handset is compatible with one particular base unit when the particular handset is communicating over the telephone network.

Known analog and digital cellular telephones typically provide greater mobility than cordless telephones, as they typically do not require a base unit to operate. Instead, a telephone network connection typically is made via a tower receiver with which a wireless communication link is achieved. However, such cellular phones typically lack the look and feel of tabletop desk or cordless telephones. For example, a typical cellular telephone does not provide a dial tone automatically when the user picks up the handset, as with typical table top or cordless telephones. Furthermore, typical cellular telephones do not provide a unit in which to program the cellular phone via linked computer.

Accordingly there is a need for a docking system that can receive and link with a wireless communications device, providing operational similarities to typical desk or cordless telephones, or a programming linkage with a computer, all without compromising the mobility offered by the wireless communications device.

SUMMARY OF THE INVENTION

The present invention alleviates to a great extent the disadvantages of the known apparatus and methods for docking a wireless communications device. In a preferred embodiment, a docking system is provided including a wireless communications device, such as an analog or digital telephone, and a docking station that includes a communications port linking the wireless communications device with the docking station. Preferably, in operation, a display screen on the wireless communications device remains active, even when linked to the docking station, providing a display used while docked. It is also preferred that the docking station include a data input/output port that can be used to establish a link with a computer, allowing the computer and wireless communications device to communicate via the docking station. In a preferred embodiment, the wireless communications device is a cellular telephone (as used herein, "cellular telephone" and "cellular phone" are define to include either an analog or a digital cellular telephone, preferably a digital cellular telephone), which includes a power storage device, such as a battery, that is recharged when the cellular phone is engaged in a docking port of the docking station.

The docking system provides seamless control of the cellular telephone and its display. The docking system may provide any of a number of input/output devices, including for example, a handset including a microphone and speaker, a base station, function keys, a telephone key pad, volume control, indicator lights, navigation keys, and speakerphone system including a microphone, speaker and associated circuitry. In operation, preferably when a user operates keys on the docking station, the effect is the same as if the same key was operated directly on the cellular telephone when not docked. Moreover, in operation, preferably the display of the cellular phone remains active and functional in the same way both when docked and when not docked.

In one example of operation of the docking system, to make a telephone call, a user optionally may pick up the handset on the docking station or activate the speakerphone on the docking station. The docking station provides a dial tone generated internally via a dial tone generating circuit. Preferably this occurs even though, in one embodiment, the docking station is not connected by wires to the telephone network. It should be understood in the context of this application that "telephone network" refers to conventional wired telephone networks and cellular telephone networks, as well as to forms of electronic communications networks suitable for voice communications, such as the Internet or cable television networks. In another aspect of the invention, a user can use the navigation keys on the docking station to view on the display an address book stored in the cellular phone and thus automatically dial a phone number. Alternatively, the user may initiate a telephone call by depressing keys on the keypad of the docking station. The docking station preferably includes software or other circuitry that recognizes forms of telephone numbers so that it is not necessary to separately depress a "send" key (such as with typical cellular phones) in order to initiate a communications session via the telephone network. Accordingly, if the docking station recognizes the form of telephone number as a 7-digit local telephone number, for example, and the user does not enter further digits within a trigger time period, then the docking station can initiate the telephone call using the connectivity to the telephone network provided by the docked cellular telephone without the necessity of an initiate signal triggered by the user such as by depressing a "send" key. The user experiences the same feel as any landline telephone.

In receiving calls, the docking station preferably generates an audible signal. To answer a call, the user can pick up the docking station handset, activate the speakerphone of the docking station, or alternatively detach the cellular telephone unit from the docking station and speak on the cellular telephone without the assistance of the docking station. Furthermore, during the call, the user may employ special features that typical desk telephone might provide. For example, during the call, the user may transfer the caller to another party or conference in a third party using functionality provided by the docking station. Such features may be provided on the docking station as function buttons which to the user appear to perform in the same way as typical desk telephones. Moreover, terminating the call is as easy as hanging up the docking station handset or turning off the speakerphone of the docking station.

Calls not received directly by a user also can be saved as messages in a voice mail system provided for the cellular phone, or optionally by the docking station and associated circuitry. For example, the docking station optionally is connected to a computer or to an office network via a communications link. Unanswered calls optionally may be answered by voicemail associated with the computer or network. Likewise the docking station optionally is connected to a local office phone network that includes voicemail functionality. An indicator on the docking station or a message on the display of the cellular phone optionally alerts the user as to an unread voice-mail message. The user can, for example, turn on the speakerphone of the docking station and depress a voice-mail function button on the docking station which automatically connects the user to the voice mail system associated with the cellular phone and/or docking station.

In another embodiment, the docking system optionally provides Internet connectivity. For example, an Internet function key optionally is provided. Associated circuitry operates to access modem communication functionality in the cellular telephone to establish an Internet session. In this embodiment a telecommunication link is established with an Internet service provider and the visual aspects of the Internet communications session appear on the cellular telephone display. The audio aspects preferably are played out of a docking station or handset speaker. Alternatively, the user may use the navigation keys on the docking station to manipulate menus on the display of the cellular phone until an Internet option is located and selected. Once the Internet communication link has been established, web pages are displayed on the display of the cellular phone. The user can navigate through the web pages via the navigation keys on the docking station or optionally using the keypad on the docking station.

The docking station can also be coupled with a computer system or network in addition to the cellular phone. The computer system can then be used to program the cellular phone or to synchronize information changes stored in either the cellular phone or the computer system. In addition, the computer system can, via the docking station, use the cellular phone as a wireless modem. In this aspect, the computer system establishes an Internet connection via the cellular telephone, and Internet web pages can be displayed on a monitor associated with the computer system, or optionally on the handset screen. In addition, navigation through the Internet is provided through input devices (e.g., a keyboard and a mouse) of the computer system.

The docking system is advantageous in providing the user with the look and feel of a conventional telephone with the enhanced mobility and convenience on accessing a wireless communications network. The docking station provides the user with a comfortable, familiar and easy-to-understand communications system. In using the features of the docking station, the effect is seamlessly applied to the cellular phone and displayed on the display. Another advantage of the docking system is that an external power supply can be provided, allowing for longer telephone connections.

These and other features and advantages of the present invention will be appreciated from review of the following detailed description of the invention, along with the accompanying figures in which like reference numerals refer to like parts throughout.

DETAILED DESCRIPTION OF THE INVENTION

In accordance with the present invention, a system is provided for docking a wireless communications device and establishing a communications session using the wireless communication device while it is docked in a docking station.

Figure 1:
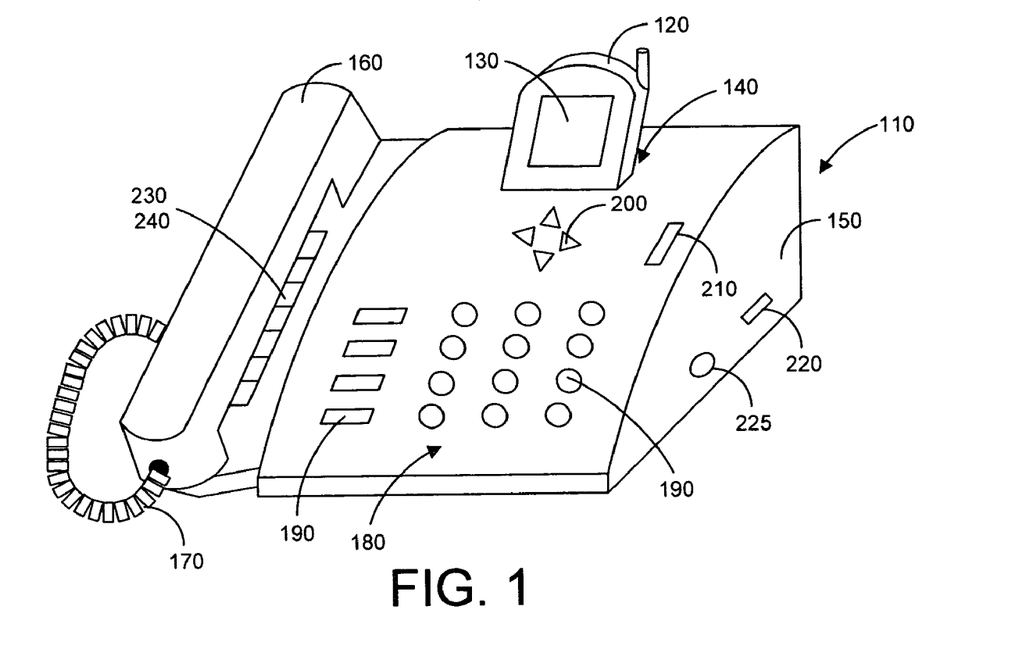
FIG. 1 is a perspective view of a cellular telephone docked in a docking station in accordance with the present invention.

As illustrated in FIG. 1, an exemplary method and system of the present invention provides a docking station 110 and a wireless communications device 120 that is illustrated as a cellular phone having a display screen 130. It will be appreciated that any wireless communications device 120 can be used that can be docked with the docking station 110, such as an analog or digital cellular telephone, paging device or radio device. In the preferred embodiment, the wireless communications device 120 is a cellular telephone and the terms "cellular telephone" and "cellular phone" as used hereinafter includes any wireless communications device. As illustrated, the cellular phone 120 is engaged in a docking port 140 of the docking station 110 by placing the cellular phone 120 inside a form fitting slot within the docking port 140. The cellular phone 120 and the docking station 110 communicate via mating ports such as serial ports, for example. In the exemplary embodiment, the cellular phone 120 may be inserted into the docking port 140 so that at least a keypad (not illustrated) of the cellular phone 120 is hidden inside the docking port 140, but so that the display 130 of the cellular phone 120 is still plainly visible.

The docking station 110 includes a base station 150 and a handset 160. The handset 160 may be coupled to the base station 150 via a cord 170. Alternatively, the handset 160 may be coupled to the base station 150 via a wireless form of communications (e.g., infrared communications, radio frequency communications, etc.).

The base station 150 may include a number of different control interfaces and features. In the exemplary embodiment, the base station 150 may include a keypad 180 that includes a plurality of keys 190 including, for example, keys for entering the numbers 0–9 and the * and # keys. Also, the base station 150 may provide functional buttons 190 that provide special features such as accessing voice mail, conference calling, call dropping, muting, speaker phone calling, re-dialing and memory. The base station 150 may also provide navigation keys 200 and an indicator (e.g., light-emitting-diodes) 210 for indicating a number of situations such as, for example, two-communication between the docking station 110 and the cellular phone 120 has been established or the cellular phone 120 is recharging. The navigation keys 200 are shown as four-way navigation keys, for example, but may also include a select key and a back key. In addition, the base station may provide a speaker 230 and a microphone 240. The speaker 230 and the microphone 240 may be used, for example, for hands-free communications such as via a speakerphone.

Although the exemplary embodiment illustrates a plurality of buttons, keys and indicators, the present invention also contemplates a display (e.g., a touch sensitive display screen) which provides, for example, a graphical-user interface and simulates some or all of the buttons, keys and indicators with graphical representations.

The base station 150 may also include a number of ports in addition to the docking port 140. For example, the base station 150 may include a parallel port or a serial port 220 (e.g., an RS-232 serial port). Furthermore, although the exemplary embodiment does not include a telephone jack (e.g., a RJ-11 jack), the base station 150 may optionally provide a telephone jack. The base station 150 also includes a power supply jack 225 into which an external power supply (not illustrated) may be plugged. In an exemplary embodiment, the docking station 110 operates from a 90-264VAC Adapter with a standard DC jack and the docking station 110 is adapted to be compatible with a Fixed Wireless Battery Backed Power supply.

In operation, a user places the cellular phone 120 into the docking port 140 of the base station 150 of the docking station 110 such that a first port on the bottom of the cellular phone 120 is mated with a second port on the bottom of the docking port 140. The docking station 150 sets up a communication link with the cellular phone 120 indicating a successful link via the indicator 210 or the display 130. The docking station 150 uses the cellular phone 120 to be coupled to a wireless communications network which, in turn, may be coupled to a landline telephony system, for example. Also, when the cellular phone 130 is placed in the docking port 140, the docking station 150 begins to recharge a battery in the cellular phone 130.

A user may then pick up the handset 160 or, alternatively, actuate the speakerphone functional button 190, to either make a call or receive a call. If making a call, the user hears a dial tone, which is artificially generated by the docking station. The user then enters a phone number via the keypad 150 and the call is connected via the cellular phone 120. The number entered via the keypad 150 may be displayed on display 130. Just as with a landline telephony system, the user may access special features (e.g., call transfer, conference call, hold, mute) via the functional buttons 190. Furthermore, the user may access special features of the cellular phone 120 via the navigation keys 200 on the docking station 110 (e.g., the navigation keys 200 may be used in accessing the Internet, voice mail, e-mail, calendars, and planners). The use may end the call by either hanging up the handset 160 or, if the speakerphone button was actuating, subsequently actuating the speakerphone button. Alternatively, the other party on the call may disconnect.

In receiving a call, the docking station 110 provides an artificial ringing sound and any applicable special features such as displaying, via the display 130, standard call origination text and/or caller identification, for example. If the user chooses not to pick up the handset, for example, or is unable to pick up the handset, the call may be forwarded to voice mail. Voice mail messages may be indicated via the indicator 210 or the display 130, and the user may access voice mail via the function buttons 190, for example. The user may then either pick up the handset 160 or, in the alternative, activate the speakerphone and communicate via the speaker 230 and the microphone 240. The use may end the call by either hanging up the handset 160 or, if the speakerphone button was actuating, subsequently actuating the speakerphone button. Alternatively, the other party of the call may disconnect.

The docking station 150 illustrated in FIG. 1 is not directly connected to the landline telephone system via conventional telephone jacks and wires or cables. Instead, in this embodiment according to the present invention, the docking station 150 communicates through the cellular phone 120, which is coupled to a wireless communications system. The wireless communications system may be coupled, for example, to the landline telephone system or the Internet.

The present invention has an advantage of providing the user with the look and feel of a landline communications system with the enhanced mobility and convenience in accessing a wireless communications network. The docking station 110 provides the user with a comfortable, familiar and easy-to-understand communications system. In using the features of the docking station 110, the effect is seamlessly applied to the cellular phone 120 and displayed on the display 130. For example, depressing the navigation keys 200 on the docking station 110 results in exactly the same effect as if the user had been depressing navigation keys on the cellular phone 120. Furthermore, the docking station 110 is portable. In addition, the user has the capability of extended duration calls when, for example, the docking station 110 is coupled to an external power supply (e.g., an AC power plug coupled to a wall outlet). In that case, the user need not be concerned with depleting the battery charge of the cellular phone 120 in making a call using the docking station 110. In addition, the docking station 110 provides the means by which the cellular phone 120 may communicate with a computer system.

II. Docking Station Linking Computer System to Cellular Phone

Figure 2:
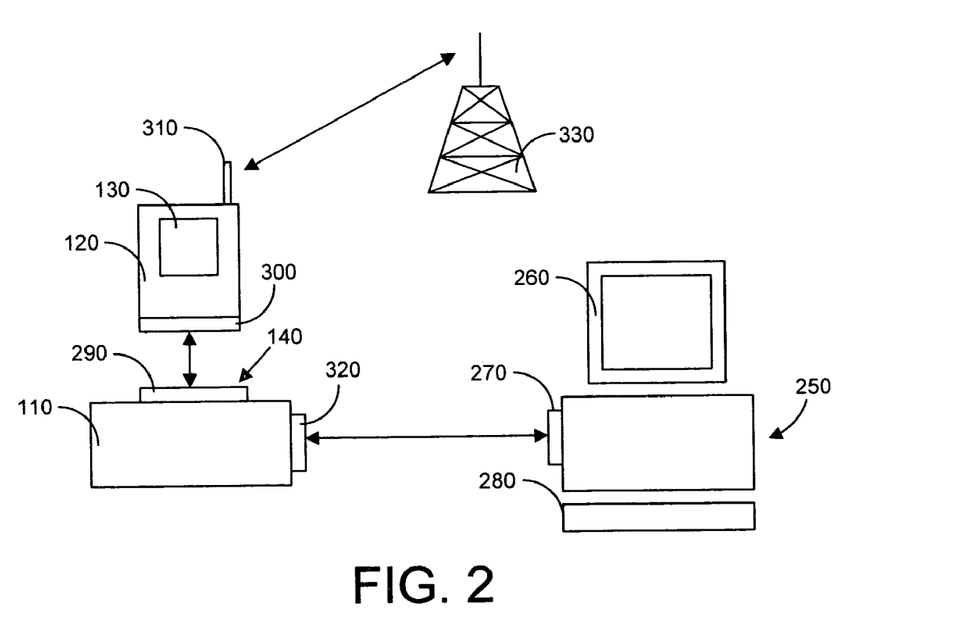
FIG. 2 is diagram illustrating an embodiment of a computer system and docking station combination in accordance with the present invention.

FIG. 2 is a schematic illustrating a computer system 250 and the cellular phone 120 communicating via the docking station 110. The computer system 250 is illustrated with a monitor 260, a port 270 and an input device 280 (e.g., a keyboard or a mouse). The port 270 may be a serial or a parallel port. The docking station 110 is illustrated as including a port 320 (e.g., a serial or a parallel port) which is adapted to match the port 270 of the computer system 250. The docking station 110 and the computer system establish a communications link by connecting the port 320 of the docking station 110 and the port 270 of the computer system 250 via a cable (e.g., a serial cable or a parallel cable). Alternatively, the communications link may be established via the port 320 of the docking station 110 and the port 270 of the computer system 250 using conventional wireless communications techniques (e.g., infrared communications, radio communications) or other techniques using cables or wires (e.g., optical cable).

The docking station 110 is also illustrated as including the docking port 140 which, in turn, includes a port 290 (e.g., a serial port). The cellular phone 120 is illustrated as including the display 130, a port 300 (e.g., a serial port) disposed towards the bottom, for example, of the cellular phone 120 and an antenna 310. The port 290 is adapted to mate (e.g., with sliding contacts) with the port 300 of the cellular phone 120 when the cellular phone 120 is placed in the docking port 140. The antenna 310 is in two-way communication with the wireless communication network 330 represented in FIG. 2 as a ground station.

Accordingly, the user may access the Internet in at least two ways. The user may connect to the Internet using the docking station 150 with the cellular phone 120 docked in the docking port 140 by accessing the Internet service provided by the wireless communications network 330. Web pages may be displayed on the display 130 of the cellular phone 120. Navigation through the Internet may be aided, for example, by using the navigation keys 200.

Alternatively, the computer system 250 can access any Internet provider via the wireless communications network 330. The computer system 250 is coupled to the docking station 150 which, in turn, is coupled to the wireless network 330 via the cellular phone 120. In an exemplary embodiment, the cellular phone 120 is acting as a wireless modem for the computer system 250. While the port 320 is active, the docking station 110 may not allow other components of the docking station 110 to access the port 290. Thus, for example, while the computer system 250 and the cellular phone 120 are using the port 290 and the port 320 of the docking station 110, the docking station 110 would not allow the user, for example, to pick up the handset 160 and initiate a call, or the docking station 110 may, for example, disable all buttons. Web pages can be displayed on the display 130 or alternatively, on the monitor 260. Navigation through the Internet may be aided by using the input device 280 (e.g., a keyboard or a mouse) of the computer system 250.

The cellular phone 120 and the computer system 250 can interact in a number of other ways. For example, the computer system 250 can program the cellular phone. The docking station 320 can assist in synchronizing information between the cellular phone 120 and the computer system 250. Thus, for example, the user may make adjustments to an appointment calendar or an address book stored in the computer system 250. The adjustments can then be downloaded to the cellular phone 120. Accordingly, adjustments made to the information stored on the cellular phone 120 can also be stored in the computer system 250. Such information can be automatically synchronized when a communication link is established between the cellular phone 120 and the computer system 250 via the docking station 110.

III. The Docking Station and the Cellular Phone

Figure 3:
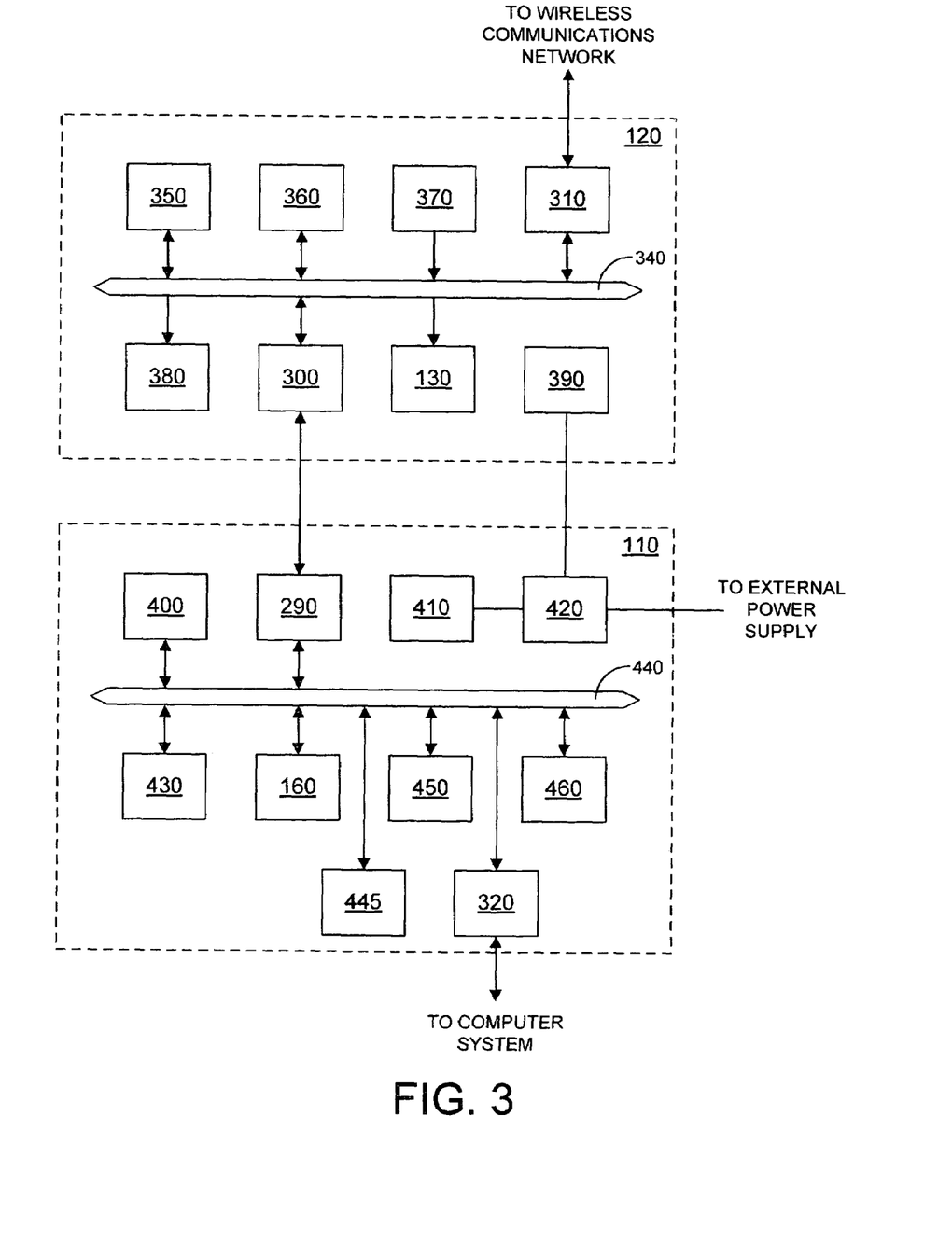
FIG. 3 is a system diagram of a typical cellular telephone and docking station in accordance with the present invention.

FIG. 3 shows a block diagram representing the cellular phone 120 and the docking station 110. The cellular phone 120 includes various components coupled via a bus 340. A controller 350 is coupled to the bus and controls access to the bus 340, for example. A memory 360 is coupled to the bus 340 and provides temporary and/or permanent memory storage (e.g., RAM or ROM). Although the controller 350 and the memory 360 communicate via the bus 340, the present invention also contemplates that various components (e.g., the controller 350 and the memory 360) can communicate directly with each other without using the bus 340 or are integrated to various degrees. Thus, the controller 350 may be partially integrated, for example, to include at least a portion of the memory 360. The cellular phone 120 also may include an input device 370 (e.g., a keypad, a microphone), the antenna 310, a speaker 380, the port 300 and the display 130. Each of these components is coupled to the bus 340. In addition, the antenna 310 may be in two-way communication with the wireless communications network 330. Furthermore, the components illustrated in FIG. 3 include appropriate interfaces where needed. Thus, for example, the antenna 310 might include an amplifier or an analog-to-digital converter (ADC). Such interfaces are well known in the art. The cellular phone 120 also includes a power supply 390 (e.g., a rechargeable battery).

FIG. 3 also illustrates a block diagram representing the docking station 110. The docking station 110 includes the port 290 of the docking port 140 which is in two-way communication with the port 300 of the cellular phone 120 when the cellular phone 120 is engaged in the docking port 140. The port 290 is in two-way communication with a bus 440. For example, a controller 400 controls access and information on the bus 440 as well as the port 290. A memory 430 is also in two-way communication with the bus 440. The memory 430 may be temporary and/or permanent (e.g., RAM and/or ROM). Although the controller 400 and the memory 430 communicate via the bus 440, the present invention also contemplates that various components (e.g., the controller 400 and the memory 430) can communicate directly with each other without using the bus 440 or are integrated to various degrees. Thus, for example, the controller 400 may be partially integrated to include at least a portion of the memory 430. The docking station 110 may also include the handset 160, speakerphone 450, input devices 460, a dial-tone generator 445 and the port 320 (e.g., a data port) each in two-way communication with the bus 440. In addition, the port 320 may be in two-way communication with the computer system 250. Furthermore, the components illustrated in FIG. 3 include appropriate interfaces where needed. Thus, for example, the speakerphone 450 and the handset 160 may include the appropriate amplifiers, multiplexers, converters and/or encoders/decoders as are well known in the art.

The docking station 110 also includes a power supply 410 (e.g., a rechargeable battery) that is coupled to a recharging unit 420. The recharging unit 420 may also be hooked up to an external power supply (e.g., an AC plug connected to a wall outlet). If the external power supply is coupled to the recharging unit 420, then the recharging unit 420 recharges the power supply 410 and, if the cellular phone 120 is properly engaged in the docking port 140, the recharging unit 420 also recharges the power supply 390. In this case, either the power supply 410 or the external power supply may power the docking station 110. If the external power supply is not coupled to the recharging unit 420, then the power supply 410 supplies power to the docking station 110 and, if the cellular phone 120 is properly engaged in the docking port 140, the recharging unit 420 recharges the power supply 390. In the alternative, the docking station 110 might not include the power supply 410, or the docking station 110 may include an internal power supply that is insufficient to power the docking station 110, but is capable of less power intensive tasks. In this case, the external power supply powers the docking station 110.

IV. Processes

FIGS. 4–10 are flow diagrams illustrating processes that are used in the docking system according to the present invention. The processes may be implemented using docking station 150 and may be stored in the controller 400, the memory 430 or some combination thereof.

Figure 4:
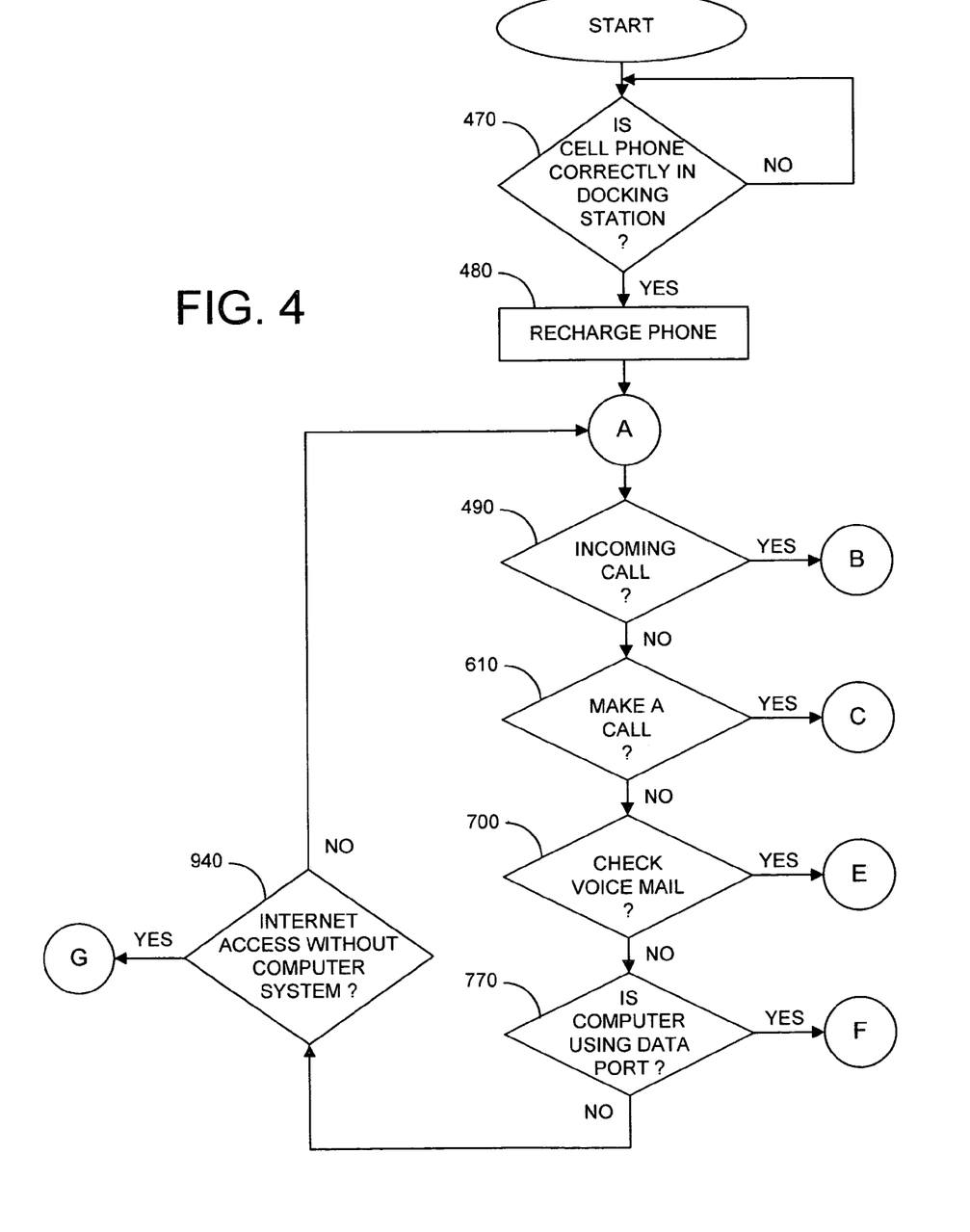
FIGS. 4–10 are flow diagrams illustrating operations of a preferred embodiment in accordance with the present invention.

In step 470, the controller 400 checks to see if the cellular phone 120 has been properly engaged in the docking port 140. If the cellular phone 120 is not properly engaged in the docking port 140, then the query is repeated until the cellular phone 120 is properly engaged. Detection can be made, for example, by detecting power flow to the docking port 140, or by a spring loaded connect which is pushed apart by the proper insertion of the cellular phone 120. After the cellular phone 120 has been properly engaged with the docking station 110, the docking station 110 begins to recharge the cellular phone 120. A recharging unit 420 in the docking station 110 recharges the power supply 390 (e.g., a rechargeable battery) in the cellular phone 120 when the cellular phone 120 is properly engaged.

A. Process for Handling Incoming Calls

Figure 5:
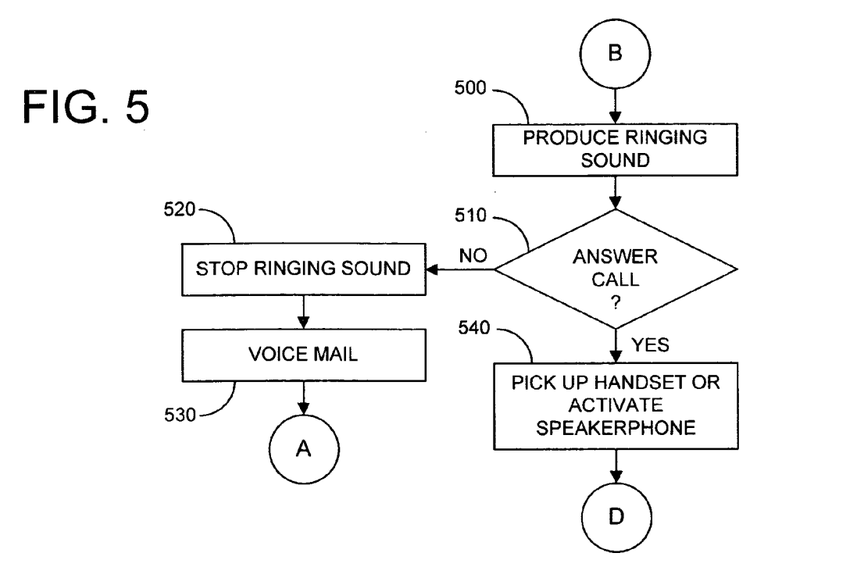

In step 490, the controller 400 checks to see if there is an incoming call from the cellular phone 120. If there is an incoming call, then the docking station 110 produces a ringing sound (e.g., a ringing sound that imitates ringing from a landline communications system) via the speaker in the speakerphone as indicated in step 500 (FIG. 5). In step 510, the controller 400 monitors whether or not the call is answered. In step 520, if the call is not answered after a certain number of rings then the ring sound is stopped and, in step 530, the call is automatically transferred to the voice mail system of the cellular phone 120 in which the caller will hear voice mail options. Afterwards, the process loops back before the query as to whether there is an incoming call (step 490). In step 510, if the user wishes to answer to the call, then, in step 540, the user may, for example, pick up the handset 160 or activate the speakerphone by depressing the speakerphone function button 190. In step 550 (FIG. 6), a two-way call is established. The user and the other caller can now talk as indicated in step 560. If the call is terminated (e.g., the connection is spontaneously dropped or the other caller hangs up), then the process loops back before the query as to whether there is an incoming call (step 490). If the call is not terminated, then controller 400 monitors whether the user wishes to terminate the call in step 570. In step 580, if the user does not wish to terminate the call, the user may continue talking in step 560. If the user wishes to terminate the call then user either hangs up the handset 160 or deactivates the speakerphone 450 as indicated in step 590. In step 600, the docking station 110 controls the cellular phone 120 so as to disconnect from the two-way call. After the disconnection, the process loops back before the query as to whether there is an incoming call (step 490).

B. Process for Making a Telephone Call

Figure 6:
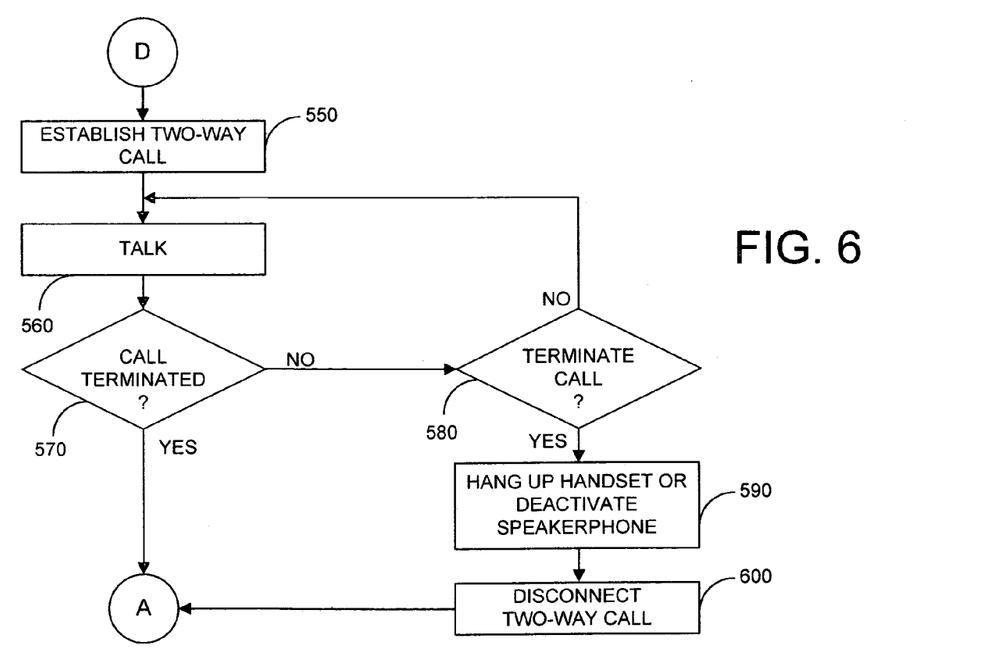
Figure 7:
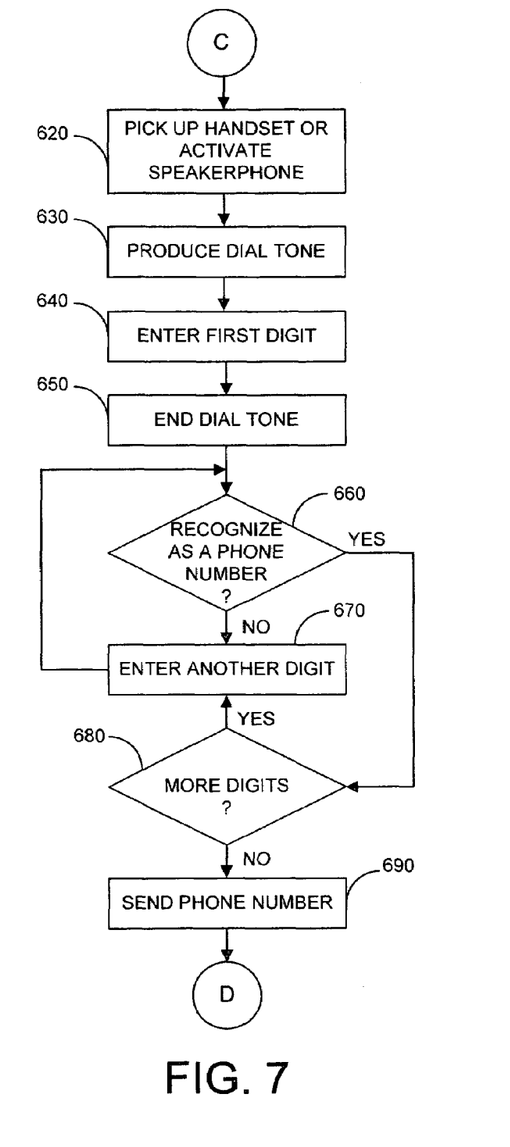
Figure 8:
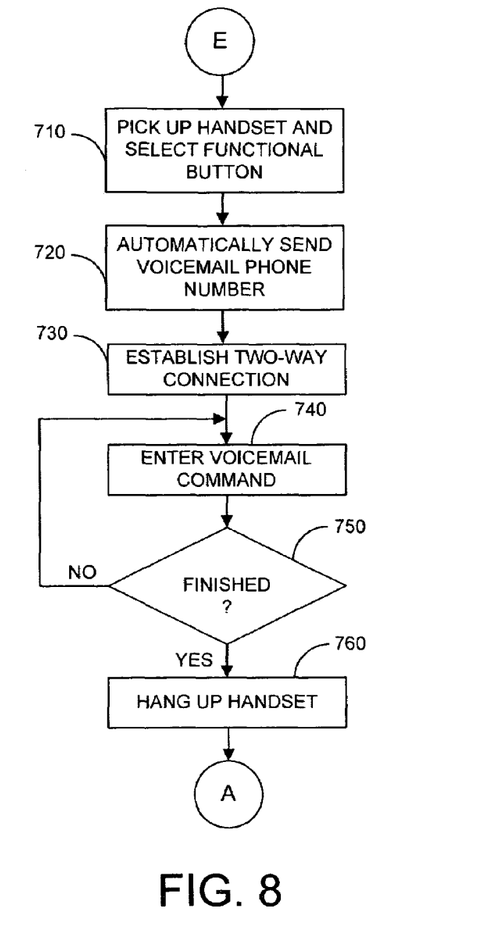

In step 610 as indicated in FIG. 4, if there is no incoming call the controller 400 monitors whether or not the user wishes to make call. If the user wishes to make a call, then, in step 620 (FIG. 7), the user picks up the handset 160 or activates the speakerphone, for example. The docking station 110 via the controller 400 or the dial-tone generator 445 then produces a dial tone as indicated in step 630. The user enters a first digit of the telephone number to be dialed (step 640), and the dial tone is ended (step 650). In query 660, the controller 400 considers whether or not the telephone entered so far is recognizable in form as a phone number. For example, recognizable forms can be certain lengths (e.g., 1-digit, 3-digit, 7-digit, 10-digit, 11-digit telephone numbers) or certain first digits (e.g., 0, *). If not then the user enters another digit (step 670) until the entered digits resemble a recognized phone number. If the entered digits resemble a recognized form of a phone number, then the controller 400 waits to see if the user will enter additional numbers. If additional digits are entered, then digits are entered until the entered numbers resemble a recognized form of a phone number (steps 670 and 660). At which point, the controller 400 waits again to see if the user will enter additional numbers, if not, then the telephone number is sent at step 690. The process goes back to continuation marker D as illustrated in FIG. 6 and described above.

C. Process for Accessing Voice Mail

In FIG. 4, if the user does not wish to make a call (step 610), then the controller 400 checks to see if the user wishes to check the voice mail for messages as indicated in step 700. If the user wishes to check for voice mail messages, then, in step 710 (FIG. 8), the user picks up the handset 160 (or, alternatively activates the speakerphone) and selects the voice-mail function button (or, alternatively uses the navigational keys in conjunction with the options displayed on the display 130 of the cellular phone 120). Subsequently, in step 720, the cellular phone automatically sends the voice mail phone number. A two-way connection is established as indicated in step 730. The user then enters a voice mail command in step 740. In query 750, the controller 400 then checks to see whether or not the user is finished. If the user is not finished, then the process loops back to where the user may enter another voice mail command (step 740). Otherwise, if the user is finished, then the user can hang up the handset 160 (or, alternatively deactivate the speakerphone) as indicated in step 760. Then the process loops back to before step 490 in which the controller 400 again monitors for an incoming call.

D. Accessing the Internet with a Computer System

In FIG. 4, in step 700, if the user does not want to check for voice mail messages, then the controller 400 checks whether the computer system 250 is using the data port 320. If the computer system 250 is using the data port 320, then controller checks whether or not the computer system 250 wishes to connect to the Internet (step 780). If not, then the process loops back to before step 490 in which the controller is checking for incoming calls.

If the computer system 250 wishes to connect to the Internet, then, in step 790 (FIG. 9), the controller disables the buttons and keys of the docking station 110. The computer system 250 then is given control of the data port 320 and the docking port 140 (step 800). In step 810, the computer system 250 then automatically sends the phone number of an Internet service provider via the docking station 110 and the cellular phone 120. A communications link is established between the computer system 250 and the Internet service provider via the docking station 110, the cellular phone 120 and the wireless communications network 330 as indicated in step 820. The computer system 250 is thus using the cellular phone 120 as a wireless modem. Information obtained from the Internet is passed through the docking station 110 to the computer system 250 where the information is displayed on the monitor 260 (step 830). Navigation through the Internet is accomplished via the input device 280 (e.g., a keyboard and/or a mouse) as indicated in step 830.

Figure 9:
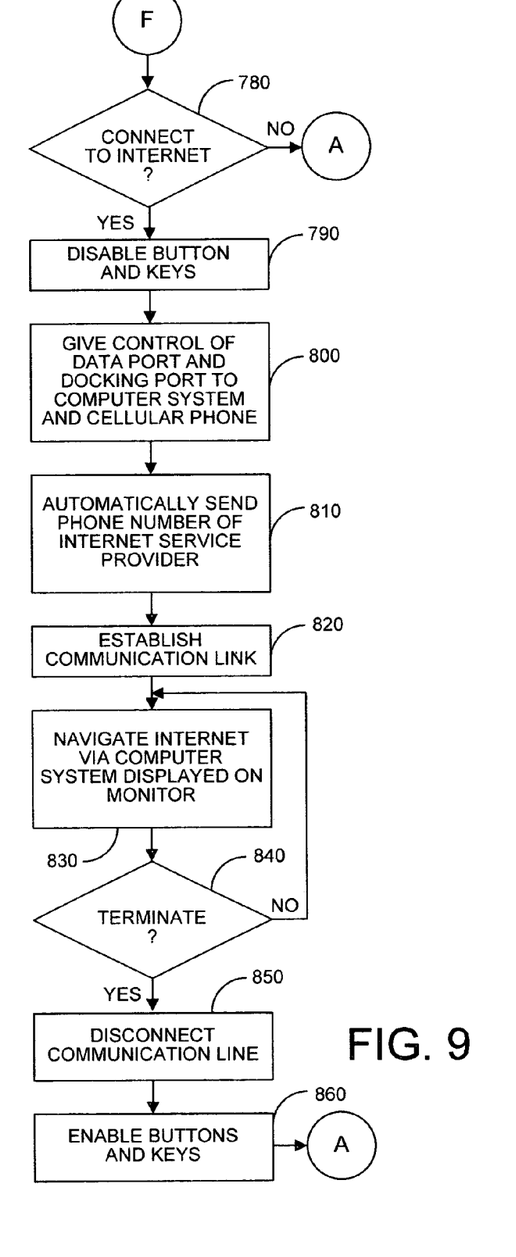

In query 840, the computer system monitors whether or not the user wishes to terminate the connection to the Internet. If not, then the process loops back to step 830 in which the user continues to surf the Internet. Otherwise, if the user wishes to terminate the Internet connection, then the computer system 250 disconnects the communication link (step 850) and the controller re-enables the buttons and keys (step 860). Subsequently, the process loops back to before step 490 in which the controller is checking for incoming calls.

E. Accessing the Internet without a Computer System

In FIG. 4, at step 940, the controller 400 checks to see whether the user would like to access the Internet without using the computer system 250. If not, then the process loops back to before step 490 in which the controller 400 checks whether there is an incoming call. Otherwise, if the user would like to access the Internet without using the computer system 250, then the user, in step 870 (FIG. 10), can depress the Internet functional button 190 to access the Internet adapted for use on the cellular phone 120. Alternatively, the user may use the navigation keys 200 on the docking station 110 to navigate seamlessly through options on the display 130 of the cellular phone 120. The user may select an option that provides Internet access adapted for use on the cellular phone 120. In either case, in step 880, the cellular phone 120 automatically sends the telephone number for the Internet service provider for cellular phones.

Figure 10:
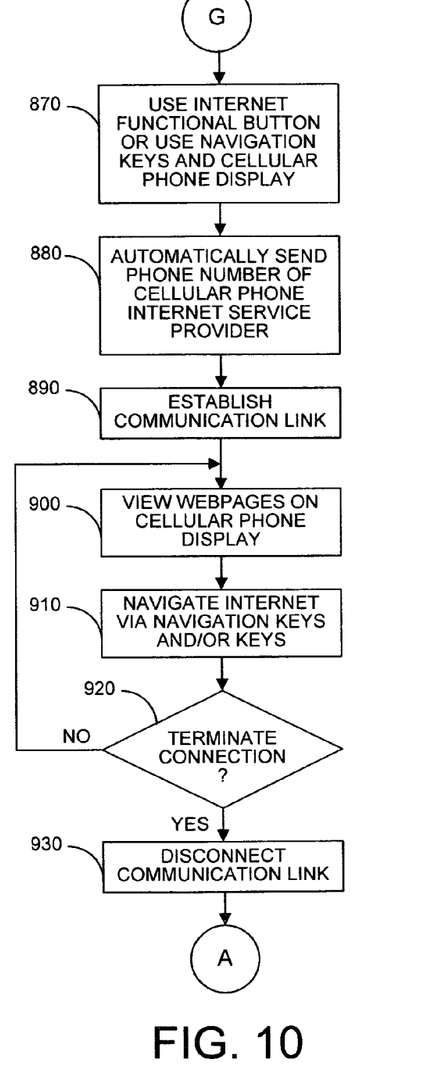

In step 890, a communication link is established. In step 900, the user views web pages on the display 130 of the cellular phone 120. The user can then navigate through the Internet that has been adapted for viewing on the display 130 on the cellular phone 120 as indicated in step 910. Although viewing the Internet on the display 130 of the cellular phone 120, the navigation is achieved seamlessly via the buttons and keys (e.g., navigation keys, keys) on the docking station 110 such that, for example, depressing navigation keys 200 on the docking station 110 has the same effect on the cellular phone 120 as depressing navigation keys on the cellular phone.

The controller 400 checks to see if the user wishes to terminate the connection at query 920. If not, then the process loops back to step 900 in which the user is viewing the web pages. If the user wishes to terminate the Internet connection, then the controller disconnects the communication link at step 930. The process then loops back to step 490 in which the controller 400 checks for incoming calls.

F. Other Processes

FIGS. 4–10 present but one aspect of the present invention. The present invention also contemplates, for example, changing the order of the queries 490, 610, 700, 770 and 940. Other changes in order fall clearly within the scope of the present invention. For example, after an affirmative answer to queries 490, 610, 700, 770, 940, the processes subsequently loop back to continuation mark A. However, this is not essential. For example, after an affirmative response to query 490 and the subsequent process as illustrated in FIGS. 5 and 6, the process may loop to the next query 610 instead of looping back to continuation mark A. Other groupings are possible as well. For example, the present invention contemplates that instead of the process going through one affirmative answer to the query 490, 610, 700, 770, 940 before looping back to continuation mark A, the process could go through two or three affirmative answers, for example, before looping back to the continuation mark A.

Thus, it is seen that an apparatus and method for docking a wireless communications device are provided. One skilled in the art will appreciate that the present invention can be practiced by other than the preferred embodiments which are presented in this description for purposes of illustration and not of limitation, and the present invention is limited only by the claims that follow. It is noted that equivalents for the particular embodiments discussed in this description may practice the invention as well.

What is claimed is:

1. A system for communicating with a wireless communications network, the system comprising:
    a cellular phone for sending signals to and receiving signals from the wireless communications network;
    a docking station for communicating with the wireless communications network through the cellular phone only when the cellular phone is engaged in the docking station, the docking station comprising:
        a controller for controlling operation of the docking station;
        a docking port comprising:
            a recess for accepting the cellular phone such that a display of the cellular phone remains visible for operating the docking station, and
            a connector connected to the controller, the connector for engaging the cellular phone;
            inside surfaces that are adapted to cover at least a keypad of the cellular phone;
        a telephone handset situated on a front surface of the docking station, the telephone handset utilized in substitution of a speaker and a microphone of the engaged cellular phone; and
        a telephone keypad situated on the front surface, the telephone keypad used in substitution for the keypad of the engaged cellular phone.

2. The system according to claim 1, wherein the controller provides a landline-type dial tone to the telephone handset when the telephone handset is lifted from the docking station and when the cellular phone is engaged in the docking port.

3. The system according to claim 1, wherein a phone call is initiated to a wireless communications network by lifting the telephone handset from the docking station and entering a phone number by only depressing numbers represented on the telephone keypad, and wherein the initiated of the phone call does not require depressing a send button on the cellular phone.

4. The system according to claim 1, wherein the docking station is adapted to recharge the cellular phone when the cellular phone is engaged with the docking station.

5. The system according to claim 1, wherein the docking station further comprises function buttons controlled by the controller, the functions buttons comprising at least one of a hold button, a transfer button, a speakerphone button, a speed dial button, a conference call button, a redial button, an internet button, a voice mail button, and an e-mail button.

6. The system according to claim 1, wherein the docking station provides modes of operation comprising at least one of call origination, answering, termination, volume control, voice mail, automatic redial, transfer, drop, conference, mute and data/fax.

7. The system according to claim 1, further comprising a computer system connected to the docking station through a data port.

8. The system according to claim 7, wherein the computer system is in two-way communication with the wireless communications network via the cellular phone.

9. The system according to claim 8, wherein the computer system accesses an Internet service of the wireless communications network.

10. The system according to claim 8, wherein the computer system receives and sends faxes via the wireless communications network.

11. The system according to claim 7, wherein the computer system programs the wireless communications device when the wireless communications device is engaged in the docking port.

12. A method for communicating with a wireless communications network, the method comprising the steps of:
    engaging a wireless communications device into a docking station, the wireless communications device comprising a display, the docking station comprising a handset, a keypad and a controller;
    establishing communication between the engaged wireless communications device and the controller of the docking station;
    utilizing at least one of the handset and the keypad in conjunction with the controller to establish a communications link between the wireless communications network and the docking station via the wireless communications device;

recharging the wireless communications device via the docking station while the wireless communications system is engaged in the docking station;

establishing a two-way communications link between the wireless communications device and a computer system via data ports of the docking station;

disabling the handset and the keypad of the docking station while the wireless communications device and the computer system are established in the two-way communications link; and using the wireless communications device as a wireless modem for the computer system to communicate with the wireless communications network.

13. The method according to claim 12, further comprising the steps of:

utilizing the display of the wireless communications device to view information relating to the communications link, wherein the communications link is one of an incoming call from the wireless communications network to the wireless communications device and an outgoing call to the wireless communications network.

14. The method according to claim 12, further comprising the steps of:

picking up the handset from the docking station to initiate a call;

generating a landline-type dial tone via the docking station;

entering digits of a telephone number on the keypad;

the controller determining a valid telephone number by recognizing a form of the telephone number; and the controller instructing the wireless communications device to initiate a call to the wireless communication network without requiring the depressing of a send button on the wireless communication device.

15. The method according to claim 12, further comprising the steps of:

picking up the handset from the docking station;

depressing a voice mail function button on the docking station;

automatically sending a voice mail telephone number to the wireless communications network via the wireless communications device as controlled by the controller of the docking station; and entering a voice mail system of the wireless communications network corresponding with the wireless communications device.

16. The method according to claim 13, further comprising the steps of:

picking up the handset from the docking station;

navigating through menus on the display of the wireless communications device by depressing navigation keys of the docking station;

selecting a voice mail menu option displayed on the display by depressing a select key of the docking station;

automatically sending a voice mail telephone number to the wireless communications network via the wireless communications device as controlled by the controller of the docking station; and entering a voice mail system of the wireless communications network corresponding with the wireless communications device.

17. The method according to claim 12, further comprising the steps of:

linking to the Internet via the wireless communications device;

displaying web pages of the Internet on a monitor of the computer system; and navigating through the Internet via an input device of the computer system.

18. The method according to claim 12, further comprising the steps of:

depressing navigation keys on the docking station to view menu options on the display of the wireless communications device;

depressing a selection key on the docking station to select an Internet menu option displayed on the display of the wireless communications device;

automatically establishing a two-way wireless communications link between the docking station and an Internet service provided by the wireless communications network via the wireless communications device;

displaying web pages of the Internet service on the display of the wireless communications device; and navigating through the Internet via the navigation keys and the keypad of the docking station.

19. The method according to claim 12, further comprising the steps of:

depressing an Internet access function button on the docking station;

automatically establishing a two-way wireless communications link between the docking station and an Internet service provided by the wireless communications network via the wireless communications device;

displaying web pages of the Internet service on the display of the wireless communications device; and navigating through the Internet via the navigation keys and the keypad of the docking station.

* * * * *